(12) United States Patent
Adams et al.

(10) Patent No.: US 11,641,421 B2
(45) Date of Patent: *May 2, 2023

(54) SYSTEM AND METHOD OF EMBEDDING AND LAUNCHING A FORM FROM THIRD-PARTY KNOWLEDGE CONTENT

(71) Applicant: Verint Systems UK Limited, Weybridge (GB)

(72) Inventors: Conor Adams, Belfast (IE); Raymond Campbell, Belfast (IE)

(73) Assignee: VERINT SYSTEMS UK LTD., Weybridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/666,857

(22) Filed: Feb. 8, 2022

(65) Prior Publication Data

US 2022/0166882 A1   May 26, 2022

Related U.S. Application Data

(63) Continuation of application No. 17/026,956, filed on Sep. 21, 2020, now Pat. No. 11,245,794, which is a
(Continued)

(30) Foreign Application Priority Data

Jun. 30, 2016   (EP) ..................... 16177306

(51) Int. Cl.
  *H04M 3/00*   (2006.01)
  *H04M 5/00*   (2006.01)
  (Continued)

(52) U.S. Cl.
  CPC .......... *H04M 3/5191* (2013.01); *G06F 16/31* (2019.01); *G06F 16/3331* (2019.01);
  (Continued)

(58) Field of Classification Search
  CPC ... H04M 3/5183; H04M 3/523; H04M 3/5232
  (Continued)

(56) References Cited

U.S. PATENT DOCUMENTS 6,012,083 A   1/2000   Savitzky et al.
6,337,858 B1  1/2002   Petty
(Continued)

FOREIGN PATENT DOCUMENTS

WO   03094490 A2   11/2003

OTHER PUBLICATIONS

Examination Report for EP16177306.4 dated Nov. 16, 2016.
(Continued)

*Primary Examiner* — Thjuan K Addy
(74) *Attorney, Agent, or Firm* — Christopher M. Scherer; Erin Ella Block; DeWitt LLP

(57) ABSTRACT

In the field of government engagement management, for users of an employee desktop web client, it is now possible, within the web client application, to search and read articles and/or knowledge content that has been authored to external locations. Due to this integration to external, third-party applications, content and/or articles can be displayed to an agent on the employee desktop web client graphical user interface. Agents can enter free text into a specific search field and review the results in summary form, and then select an article in HTML format to progress the current interaction with the client. An additional feature extending from this capability is to add an amount of coding to external knowledge content websites that are owned and/or operated by the owner of the system such that when the website is viewed through the third-party integration module, a button or icon appears within the website that when selected takes the agent to an appropriate form. This button or icon does not appear when the website is viewed outside of the system.

(Continued)

This functionality adds value to the agent experience and enables the agent to provide an improved service to the end client. Results may be filtered by the search engine as well. Moreover, this system and method improves the operation of the computer in that the computer running such a system in the past was not able to integrate in such a fashion in a web client format. This system and method also enable an agent to handle calls with the web client more efficiently and allows agents on the web client to automatically classify.

20 Claims, 7 Drawing Sheets

Related U.S. Application Data continuation of application No. 16/211,794, filed on Dec. 6, 2018, now Pat. No. 10,785,372, which is a continuation-in-part of application No. 15/987,574, filed on May 23, 2018, now Pat. No. 10,187,526, which is a continuation of application No. 15/217,240, filed on Jul. 22, 2016, now Pat. No. 9,986,093.

(51) Int. Cl.
| | |
|---|---|
| H04M 3/51 | (2006.01) |
| G06F 16/33 | (2019.01) |
| G06Q 30/016 | (2023.01) |
| G06Q 50/26 | (2012.01) |
| H04L 67/02 | (2022.01) |
| G06F 16/34 | (2019.01) |
| G06F 16/31 | (2019.01) |
| G06N 5/022 | (2023.01) |

(52) U.S. Cl.
CPC ........... *G06F 16/345* (2019.01); *G06N 5/022* (2013.01); *G06Q 30/016* (2013.01); *G06Q 50/26* (2013.01); *H04L 67/02* (2013.01)

(58) Field of Classification Search
USPC ............ 379/265.09, 265.05, 265.04, 265.11, 379/265.12, 265.01
See application file for complete search history.

(56) References Cited

U.S. PATENT DOCUMENTS

| | | |
|---|---|---|
| 6,338,056 B1 | 1/2002 | Dessloch |
| 7,593,522 B2 | 9/2009 | Parker-Stephen |
| 7,720,833 B1 | 5/2010 | Wen et al. |
| 7,724,890 B1 | 5/2010 | Conrad et al. |
| 8,417,746 B1 | 4/2013 | Gillett |
| 9,178,994 B2 | 11/2015 | Tuchman |
| 9,356,574 B2 | 5/2016 | Denningoff |
| 9,454,761 B2 | 9/2016 | Tuchman |
| 9,641,680 B1 | 5/2017 | Wold |
| 9,699,315 B2 | 7/2017 | Waalkes et al. |
| 9,747,621 B1 | 8/2017 | Kuruvila |
| 10,521,496 B1* | 12/2019 | Goodwin ............. G06F 40/205 |
| 2001/0029483 A1 | 10/2001 | Schultz |
| 2004/0088300 A1 | 5/2004 | Avery et al. |
| 2005/0053224 A1 | 3/2005 | Pennington et al. |
| 2005/0091059 A1 | 4/2005 | Lecoeuche |
| 2005/0193055 A1 | 9/2005 | Angel et al. |
| 2006/0100788 A1 | 5/2006 | Carrino et al. |
| 2007/0038499 A1 | 2/2007 | Margulies |
| 2008/0172598 A1 | 7/2008 | Jacobsen et al. |
| 2009/0285392 A1 | 11/2009 | Leitheiser |
| 2009/0293007 A1 | 11/2009 | Duarte |
| 2011/0208660 A1 | 8/2011 | Erbey et al. |
| 2011/0211687 A1 | 9/2011 | Bethea |
| 2011/0264677 A1 | 10/2011 | Hermitage et al. |
| 2012/0109822 A1 | 5/2012 | Bouse |
| 2012/0203757 A1 | 8/2012 | Ravindran |
| 2012/0290614 A1 | 11/2012 | Nandakumar |
| 2013/0035995 A1 | 2/2013 | Patterson |
| 2013/0097172 A1 | 4/2013 | McIntosh |
| 2013/0104088 A1 | 4/2013 | Santos-Gomez |
| 2013/0117289 A1 | 5/2013 | Fischer |
| 2013/0230154 A1 | 9/2013 | Wilson |
| 2014/0119531 A1 | 5/2014 | Tuchman |
| 2014/0359462 A1 | 12/2014 | Khalil |
| 2015/0089345 A1 | 3/2015 | Marimuthu |
| 2015/0095753 A1 | 4/2015 | Gajera |
| 2015/0195406 A1 | 7/2015 | Dwyer |
| 2015/0227276 A1 | 8/2015 | Batti |
| 2015/0317395 A1* | 11/2015 | Arkin ................... G06F 16/986 707/706 |
| 2015/0363765 A1 | 12/2015 | Alimi |
| 2015/0379995 A1 | 12/2015 | Sims |
| 2016/0021179 A1 | 1/2016 | James et al. |
| 2016/0044497 A1 | 2/2016 | Soini |
| 2016/0063897 A1 | 3/2016 | Rusin |
| 2016/0119788 A1 | 4/2016 | Mandyam |
| 2016/0179906 A1 | 6/2016 | Roustant |
| 2016/0180257 A1 | 6/2016 | Rees et al. |
| 2016/0239848 A1 | 8/2016 | Chang |
| 2016/0267422 A1 | 9/2016 | Kothadiya |
| 2017/0060856 A1 | 3/2017 | Turtle |
| 2017/0068976 A1 | 3/2017 | Wawrzynowicz |
| 2017/0178145 A1 | 6/2017 | Adrian et al. |
| 2017/0337207 A1 | 11/2017 | Ravidran |
| 2018/0165375 A1 | 6/2018 | Silkey |
| 2019/0294640 A1 | 9/2019 | Chuah |

OTHER PUBLICATIONS

Examination Report for EP16177307.2 dated Nov. 16, 2016.
Office Action for U.S. Appl. No. 15/217,188 dated Mar. 4, 2018.
Notice of Allowance dated Mar. 14, 2018, for U.S. Appl. No. 15/217,240.
Examination Report for EP16177306.4 dated Feb. 22, 2019.
Examination Report for EP16177307.2 dated Feb. 22, 2019.
Examination Report for EP16177308.0 dated Feb. 22, 2019.
Notice of Allowance dated Jun. 12, 2019, in U.S. Appl. No. 16/248,954.
NAQC Issue Paper, Call Center Metrics: Fundamentals of Call Center Staffing and Technologies, North Consortium, 2010. (Year: 2010).

* cited by examiner

SYSTEM AND METHOD OF EMBEDDING AND LAUNCHING A FORM FROM THIRD-PARTY KNOWLEDGE CONTENT

CROSS-REFERENCE TO RELATED APPLICATIONS

The present application is a continuation of U.S. application Ser. No. 17/026,956, filed Sep. 21, 2020, which application is a continuation of U.S. application Ser. No. 16/211,794, filed Dec. 6, 2018, which application is a continuation-in-part of U.S. application Ser. No. 15/987,574, filed May 23, 2018, which application is a continuation of U.S. application Ser. No. 15/217,240, filed Jul. 22, 2016, which application claims priority of European Patent Application No. 16177306.4, filed Jun. 30, 2016, the contents of which are incorporated herein by reference in their entireties.

BACKGROUND

In exemplary government engagement management systems, web client or web-based interaction and engagement systems are unable to accommodate the use of external knowledge searching capabilities. In other words, current systems are unable to use external, third-party systems seamlessly through the engagement management system in order to collect relevant knowledge content for the interaction with a client.

SUMMARY

In the field of government engagement management, for users of an employee desktop web client, it is now possible, within the web client application, to search and read articles and/or knowledge content that has been authored to external locations. Due to this integration to external, third-party applications, content and/or articles can be displayed to an agent on the employee desktop web client graphical user interface. Agents can enter free text into a specific search field and review the results in summary form, and then select an article in HTML format to progress the current interaction with the client. An additional feature extending from this capability is to add an amount of coding to external knowledge content websites that are owned and/or operated by the owner of the system such that when the website is viewed through the third-party integration module, a button or icon appears within the website that when selected takes the agent to an appropriate form. This button or icon does not appear when the website is viewed outside of the system. This functionality adds value to the agent experience and enables the agent to provide an improved service to the end client. Results may be filtered by the search engine as well. Moreover, this system and method improves the operation of the computer in that the computer running such a system in the past was not able to integrate in such a fashion in a web client format. This system and method also enables an agent to handle calls with the web client more efficiently, and allows agents on the web client to automatically classify.

In one embodiment of the present application, a method of embedding and launching a form with an external application for an agent in a web client application, the method comprises starting an interaction with a client with the web client application by the agent, searching for relevant knowledge content through a third-party integration module using a graphical user interface, launching a knowledge content form from a knowledge content website with an embedded knowledge content button and completing the knowledge content form, and completing the interaction with the client with enhanced input from the search step.

In an additional embodiment of the present application, a non-transitory computer readable medium programmed with computer readable code that upon execution by a computer processor causes the computer processor to start an interaction with a client with the web client application by the agent, search for relevant knowledge content through a third-party integration module using a graphical user interface, launch a knowledge content form from a knowledge content website with an embedded knowledge content button and completing the knowledge content form, and complete the interaction with the client with enhanced input from the search step.

As set out above, the embodiments allow integration of a plurality of system parts into a web client application. This makes the overall system more user-friendly because a user does not need to switch between different system parts that are running in separate user interfaces, but instead is able to interact with multiple system parts through a single user interface, such as a web client application. This simplifies the way in which the user interacts with the overall system and therefore makes it easier for the user to use.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In the field of government engagement management systems, agents in web client systems may wish to run specific scripts that allow the agent to be more efficient in handling interactions with a customer more efficiently by improving the operation of the system and computer generally. In such cases, the user logs on to an employee desktop web client as an interaction handling agent and starts an interaction with the user, by clicking on a VOICE IN button or another activation button on an interaction bar, thus allowing a script-flow to launch and display to the agent. The agent will then speak the text shown on the graphical user interface to the client and select the menu based on the response of the client. The agent may then be shown different screens in the content panel based on the nature of the call, and the interaction with the client is ended when the client has no more queries for the agent, and/or when the script-flow is completed.

Figure 8:
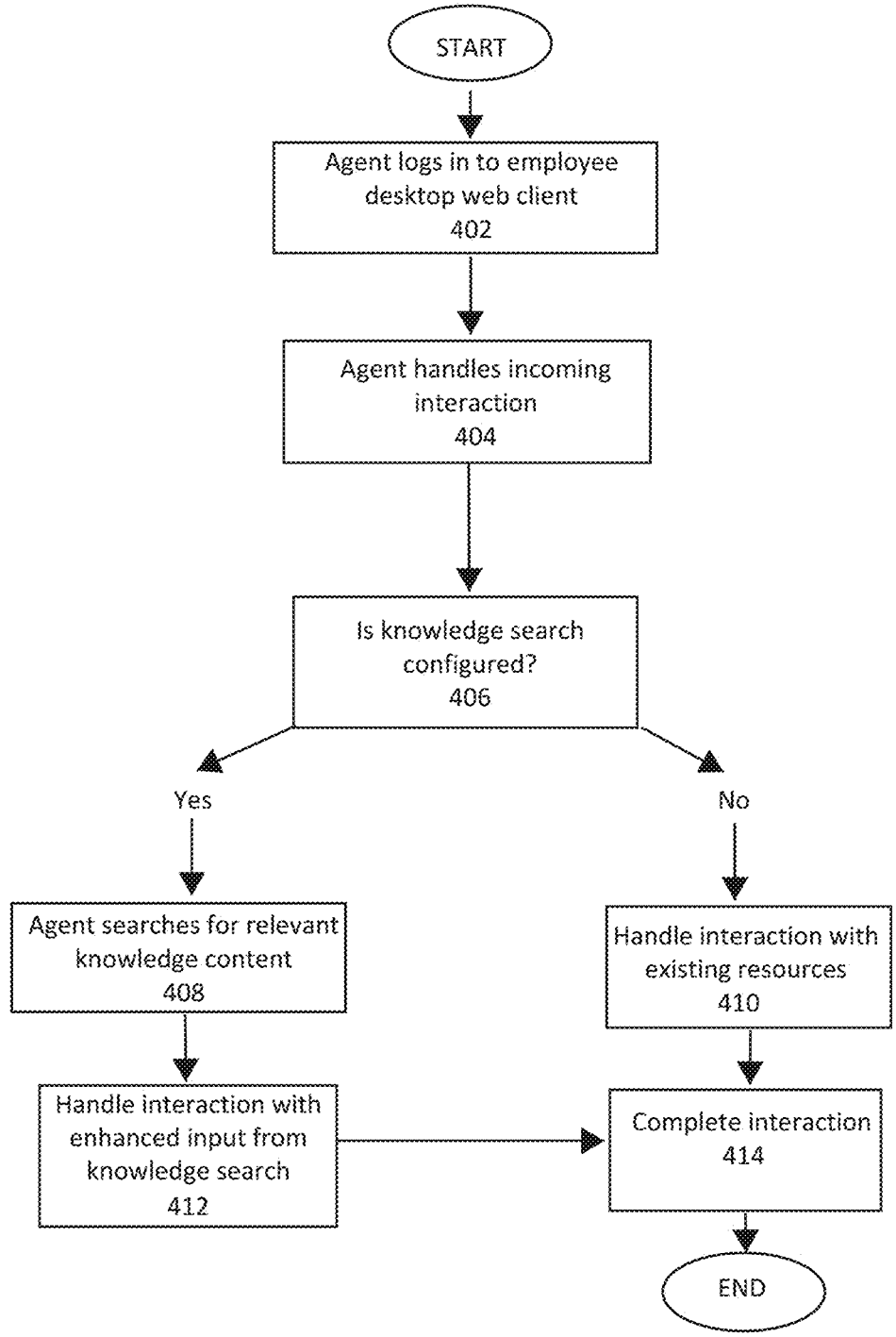
FIG. 8 and FIG. 9 are flow charts of exemplary embodiments of methods of the present application.
Figure 9:
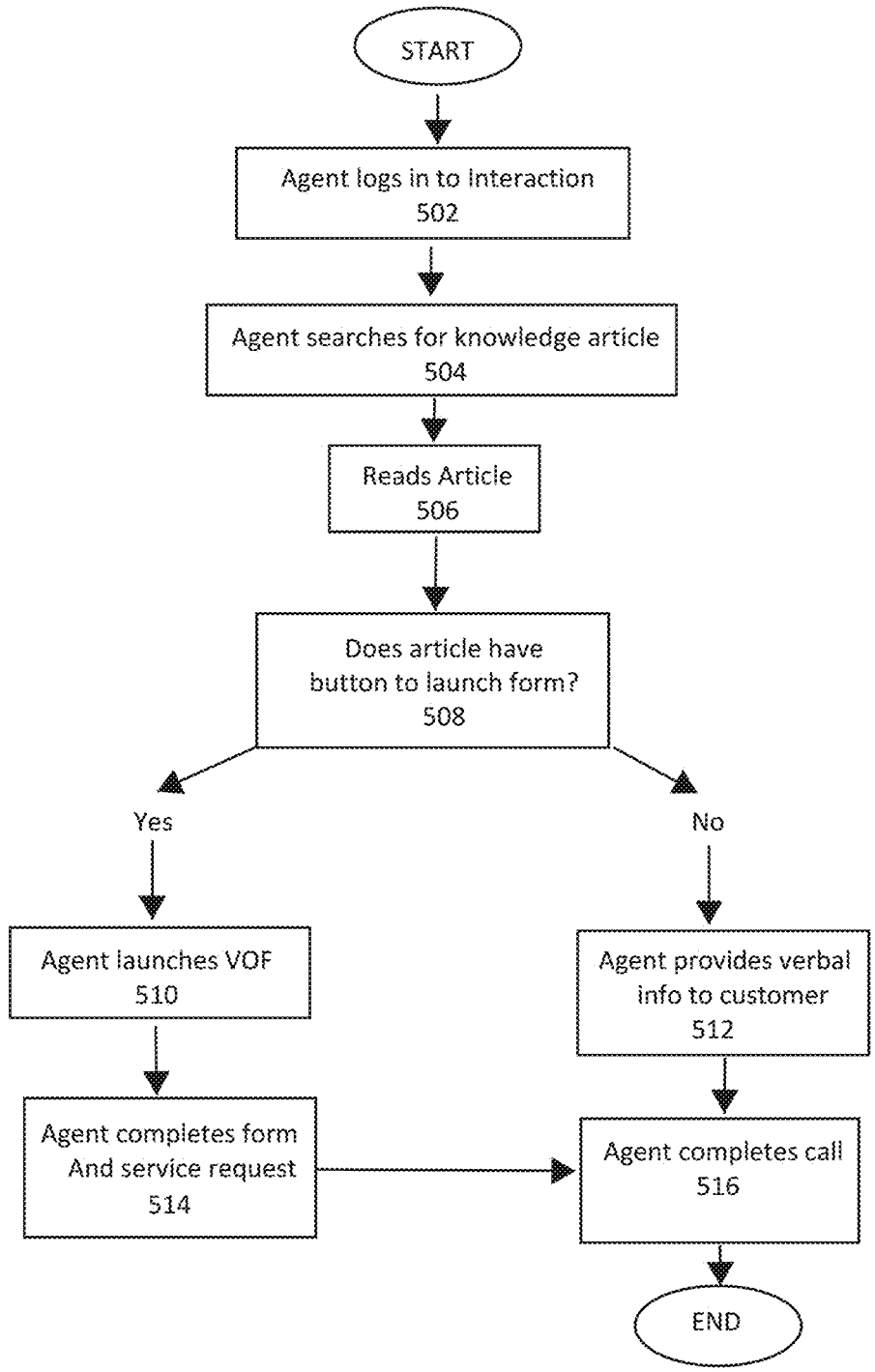

FIGS. 8 and 9 are flow charts that depict exemplary embodiments of methods 400/500 of external integration. FIG. 8 illustrates a method 400 of the present application, and in an exemplary embodiment is performed in real-time during an agent/client interaction. In step 402, the agent logs into the employee desktop web client application, and in step 404 the agent begins to handle an incoming interaction with a client. If in step 406 the knowledge search feature of the web client application is configured, then the agent is able to conduct searches for relevant knowledge content in step 408. If the knowledge search application is not configured in step 406, then the agent handles the interaction without the knowledge content search capability in step 410, and the interaction with the client is completed in step 414. In step 412, the agent handles and processes the interaction with the enhanced input from the knowledge search in step 408, and then the interaction with the client is completed in step 414.

FIG. 9 also illustrates a method 500 of the present application, and in an exemplary embodiment is performed in real time during an agent/client interaction. In step 502, the agent logs into the system and engages in a client interaction. According to the method 400, the agent searches for an external knowledge article in step 504, and reviews the article for content in step 506. If the knowledge article is located on a website where code has been added to implement a button or icon when viewed through the system 100, then after step 508, the agent will launch the knowledge content form in step 510. The agent then completes the form and service request in step 514 before completing the call with the client in step 516. If in step 508 the article does not have a button or icon to launch the form, then in step 512, the agent provides verbal information to the client from the article 508 and completes the call in step 516.

Figure 2:
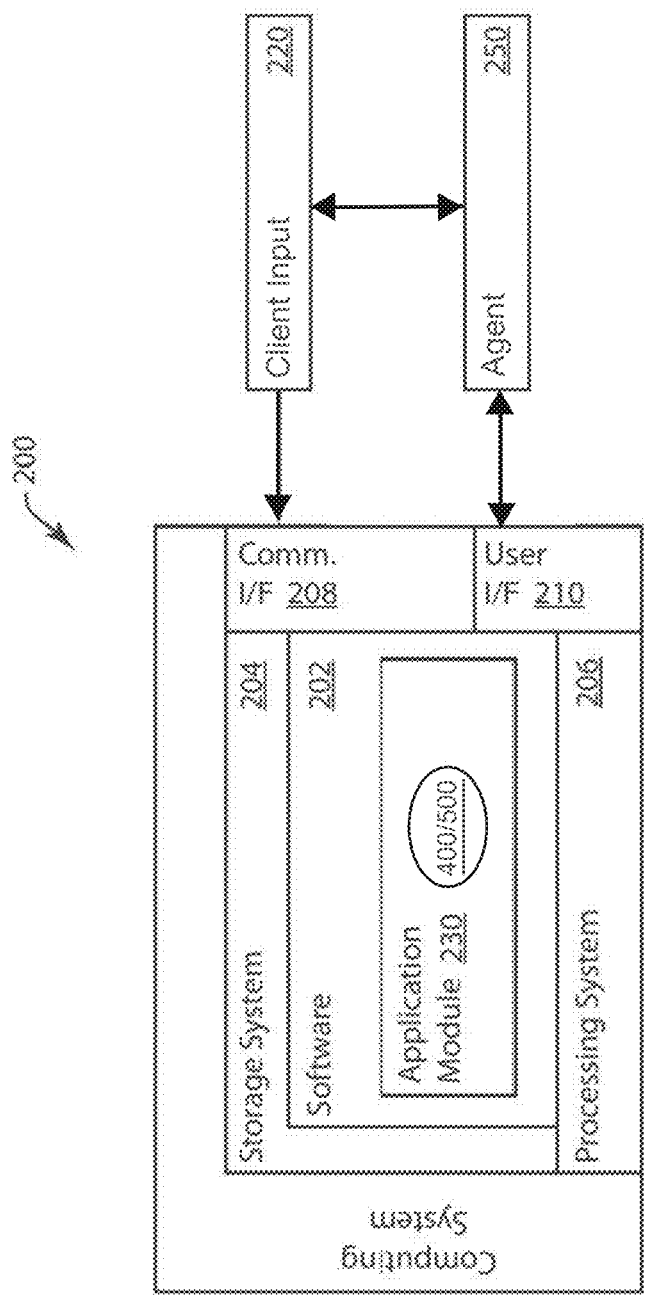
FIG. 2 is a block diagram of an exemplary embodiment of a system of the present application.

FIG. 2 is a system diagram of an exemplary embodiment of a system 200 for external application integration. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the methods 400 and 500, as in further embodiments in accordance with the methods 400 and 500 described herein with respect to FIGS. 8-9.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description. It is also contemplated that these components of the computing system 200 may be operating in a number of physical locations described below in the system 100 of FIG. 1.

The processing system 206 can comprise a microprocessor and other circuitry that retrieves and executes software 202 from storage system 204. Processing system 206 can be implemented within a single processing device but can also be distributed across multiple processing devices or sub-systems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210. An agent 250 communicates with the computing system 200 through the user interface 210 in order to enter client input 220, to manage an interaction, or any number of other tasks the agent 250 may want to complete with the computing system 200 as well be described in greater detail below.

As described in further detail herein, the computing system 200 receives and transmits data through communication interface 208. In embodiments, the communication interface 208 operates to send and/or receive data to/from other devices to which the computing system 200 is communicatively connected, and to received and process client input 220, as will be described in greater detail below. The client input 220 will include details about a request, work order or other set of information that will necessitate an interaction between the client and the agent. Client input 220 may also be made directly to the agent 250, as will be described in further detail below.

Figure 1:
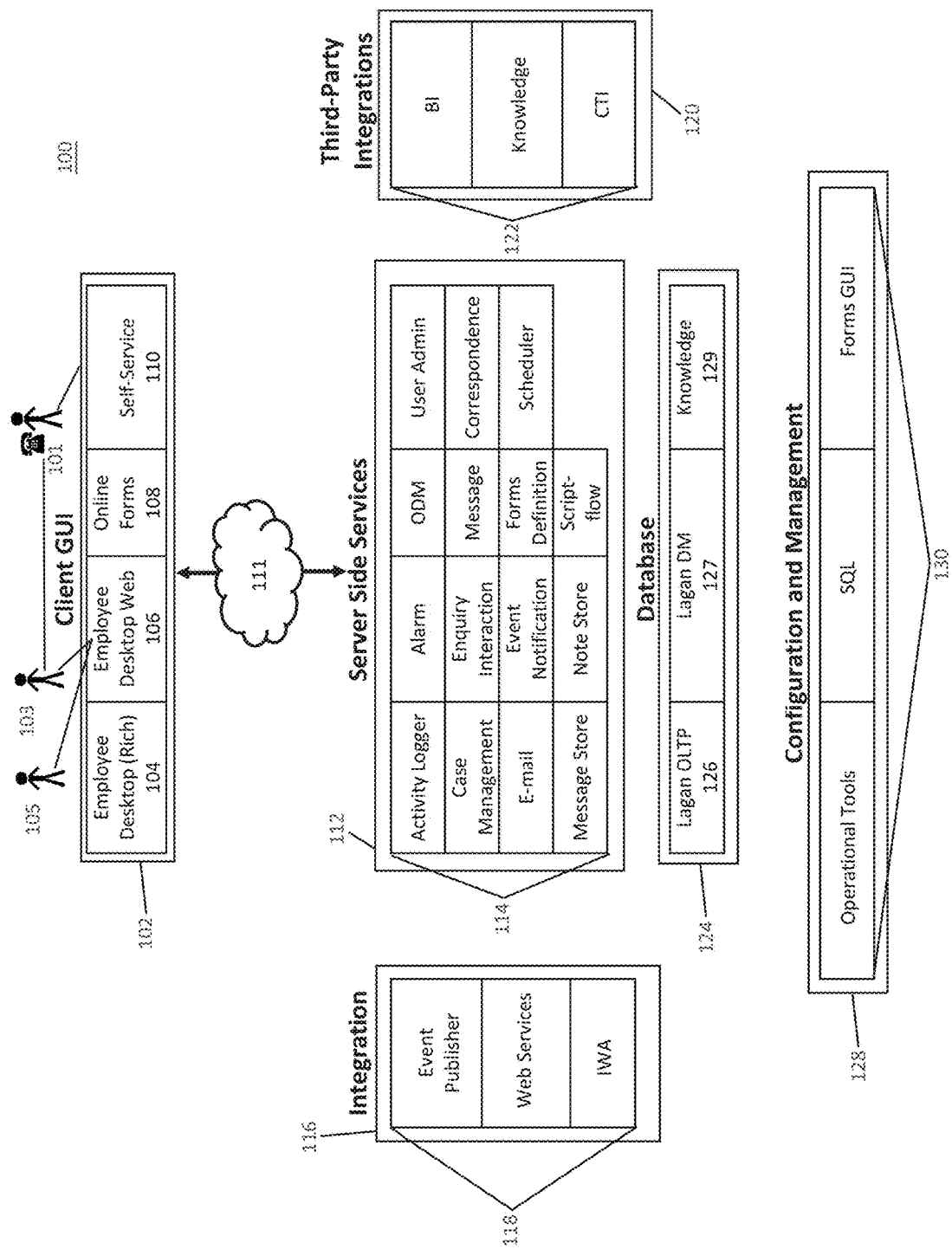
FIG. 1 is a block diagram of an exemplary embodiment of a system of the present application.

FIG. 1 illustrates a block diagram of an engagement management system 100 according to the present application. The client graphical user interface (GUI) 102 includes a number of client applications 104, 106, 108, 110 and serves as the client 101 and agent 103, 105 interface for the system 100. The client GUI 102 may include any of the following applications: first, an employee desktop 104, an employee desktop 106, an online form application 108 and a self-service application 110. The employee rich desktop 104 is not the subject of this application. The client 101 in such a system 100 may contact the client GUI 102 in order to report a problem, issue and/or make a work request, or any other type of interaction that the client 101 may have with the government entity utilizing this system 100. The client 101 may contact the system 100 in a number of ways over a number of mediums, such as but not limited to, e-mail, voicemail, online access, and/or through direct telephone contact. In the case of utilizing a telephone in order to start an interaction, the user 101 may contact a front-end agent 103 directly to report an incident or work request. The front-end agent 103 will then utilize the employee desktop 106 to create an interaction order for the client. This interaction order may be carried out by the front-end agent 103 at the time of the call or at a later time, or by a back-end agent 105 who may only handle the processing of such orders. The client 101 may also call into the client GUI 102 system and leave a voicemail, e-mail the client GUI 102, or log in to a client app (not shown) in the client GUI 102 in order to create an interaction order as well. The client GUI 102 also includes an online form application 108 that allows the agent 103, 105 to save a number of standard and/or commonly used forms for the agent 103, 105 to use, and a self-service application 110 where the client 100 may log in and create an order without interacting with an agent 103, 105.

The client GUI 102 is therefore the point of interface for the client 101 as well as the agent 103, 105 in the system 100, and is in communication with the remainder of the system through a network 111. The network is preferably the internet, or another LAN, but generally the system 100 described here in the present application is directed toward the employee web desktop application 106, that utilizes a client GUI 102 separated by the remainder of the system 100 through the internet.

The server-side services 112 include a number of service applications 114 utilized by the employee web desktop 106. The service applications shown in FIG. 1 are exemplary only, and may be interchanged with other applications and/or some applications may be removed. The system 100 also includes an integration module 116 that includes a number of integration applications 118 that may be utilized to integrate with other portions of the system 100 that are not shown, as well as a third-party integration module 120 that includes third-party integration applications 122 that may be utilized to integrate with other systems and applications outside of the current system 100. In operation, the agent 103, 105 utilizing the client GUI 102 of the employee desktop web application 106 accesses the server-side services 112 through the network 111, and the appropriate server-side services 112 application integrates an external search engine through one of a plurality of third-party integration applications 120. This integration to the third party search application is seamlessly integrated into the employee desktop web client application 106 such that the client GUI 102 incorporates the search capabilities into the web client application 106 as will be described in greater detail and illustrated in the FIGS. 3-7.

Still referring to FIG. 1, the system and method of the present application has found a solution to embed code in the third-party knowledge article, which, when viewed through the client graphical user interface 100, will render as a button or icon in the third-party knowledge article, and allow the agent 103, 105 to select the button or icon to display a context specific online form to be completed by the agent. With the form, the agent 103, 105 can capture information on a specific service request related to the third-party knowledge article. However, if the knowledge article is shown and/or accessed outside of the system 100, the button or icon will either not render at all or render in a different fashion according to the owner's preference. It should be noted that the external website where this embedded code is added is typically that of the owner that is implementing the system 100 of the present application. Of course, other related websites may also embed such code that allows such functionality.

The databases 124 include an online transactional process database (OLTP) 126 that stores all configuration and interaction data, as well as providing a secure and resilient way of holding information and enables data extraction using standard database reporting tools. The databases 124 may be held on a physically separate machine from the server-side services 112 or on the same physical location. The OLTP database 126 stores all of the data needed for interaction case manipulation and/or execution. The data mart (DM) database 127 is a reporting database configured so that reporting does not have to be done from the OLTP database 126. The knowledge database 129 is utilized for the owner of the engagement management system 100 to store its own website or other information. The configuration module 128 includes a number of configuration applications 130 that are utilized to set-up, maintain and configure the system 100.

Figure 3:
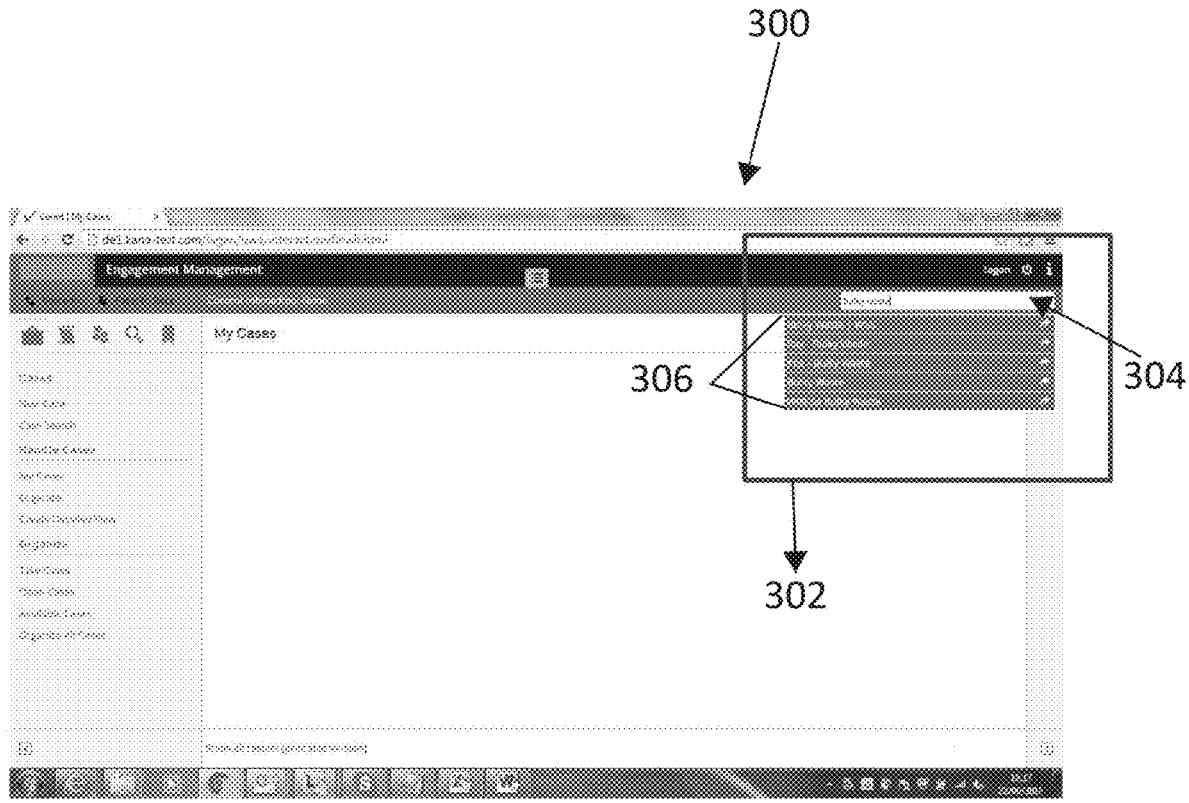
FIG. 3-7 are screen shots illustrating graphical user interfaces exemplary of an embodiment of the system of the present application.
Figure 4:
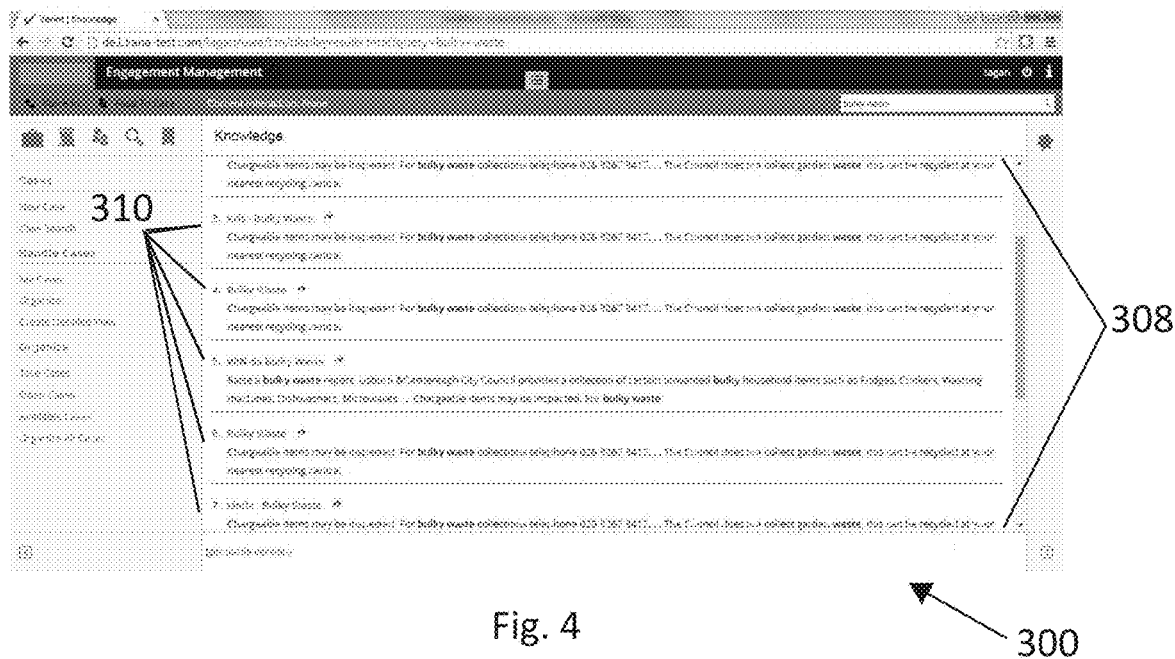
Figure 5:
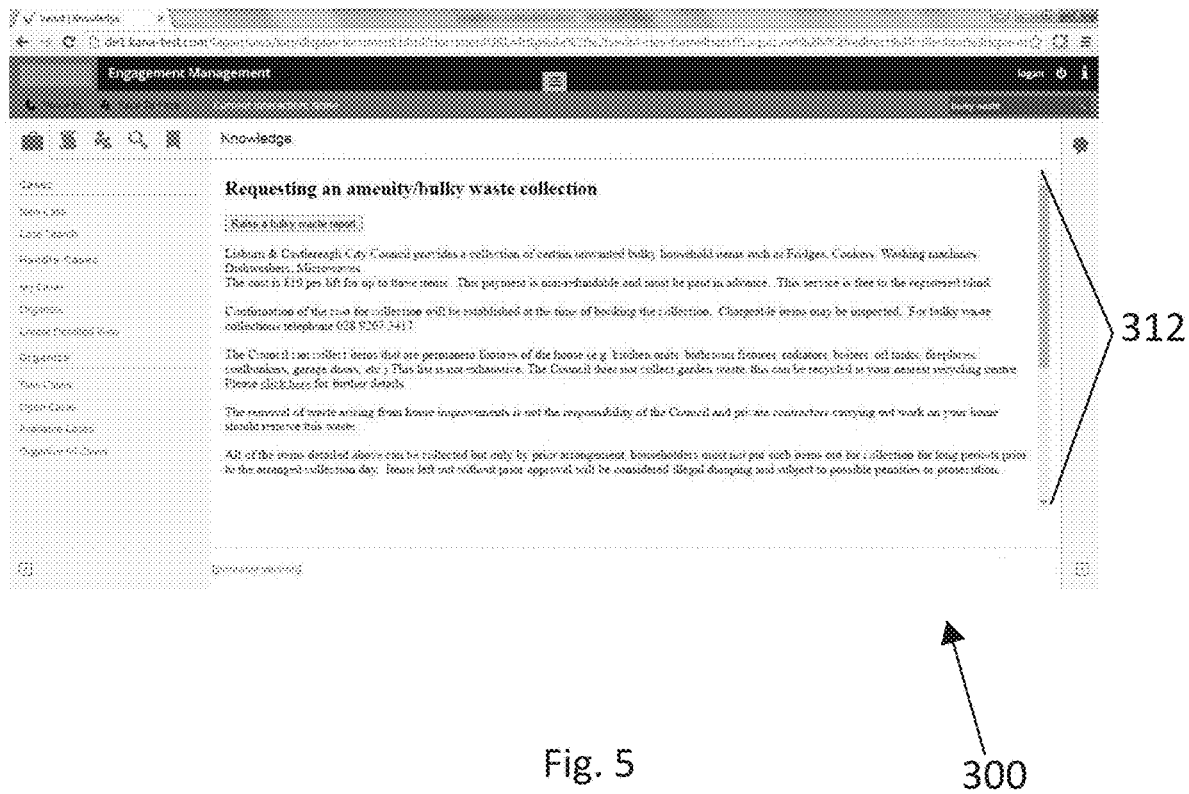

FIG. 3 illustrates a graphical user interface 300 of the system and method of the present application before external content is searched by an agent. Referring to FIGS. 3-5 simultaneously, the graphical user interface 300 first includes an integrated search area 302 that includes both the search term box 304 and the result preview area 306. When an agent wishes to utilize this functionality, the user enters search terms into the search term box 304, and as the agent enters the search terms, the result preview area 306 displays possible search results prior to the agent pressing the return key or selecting the search icon. Referring now to FIG. 4, once the agent presses the return key or selects the search icon, a search results area 308 presents the agent with the search results 310. Here, the agent can review summaries of the search results 310 and select a result that the agent thinks might be useful content for the interaction with the client. Referring to FIG. 5, once the agent selects one of the search results 310, the selected result 312 will display for the agent. Once the agent is finished with the selected result, the agent may return to the search results area 308 to choose another search result 310, or simply close the selected result 312 and discontinue utilizing this feature, and return to the interaction with the client.

Figure 6:
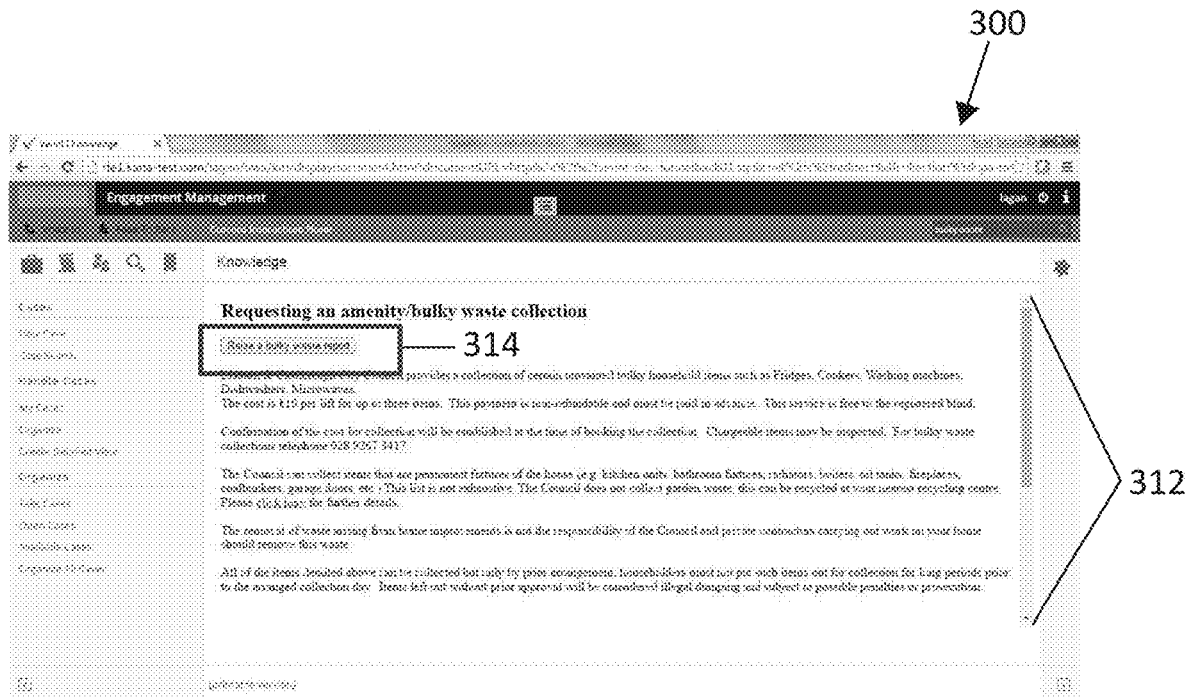
Figure 7:
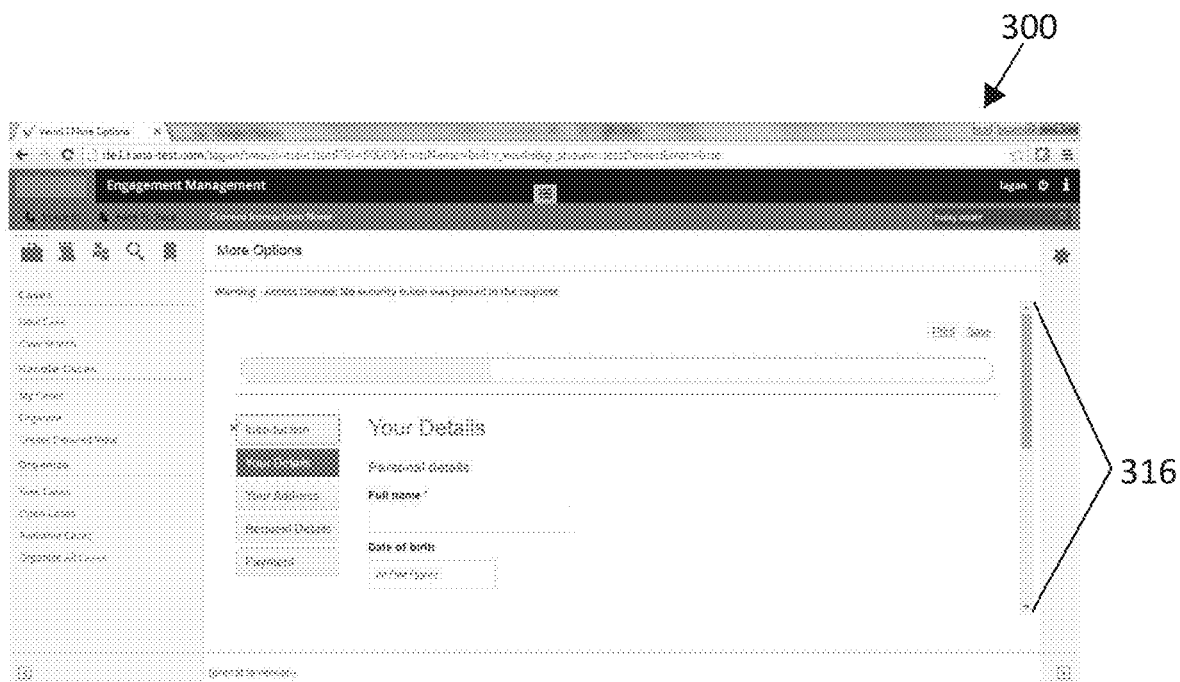

As described above, the system and method of the present application also includes additional functionality related to this graphical user interface 300, as depicted in FIGS. 6 and 7. Specifically, the selected result 312 may also include a form button 314, that may render as a button and/or an icon that allows a user when selecting the form button 314 to launch an appropriate form 316 related to the content of the selected result 312. As discussed above in detail, this form button 314 renders only through viewing of the selected result through the system 100 of the present application.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method of embedding and launching a form with an external application for an agent in a web client application, the method comprising:
    starting the web client application by the agent, wherein the web client application utilizes a graphical user interface;
    using, by the agent, the graphical user interface to initiate an interaction with a client through the web client application;
    searching, by the agent, for relevant third-party knowledge content through a third-party integration module using the graphical user interface;
    viewing, on the graphical user interface, a third-party knowledge content article received through the relevant knowledge content search on the graphical user interface, wherein the third-party knowledge content article is from a third-party knowledge content website, further wherein, only when viewed through the graphical user interface of the web client application, the third-party knowledge content article contains a rendered selectable knowledge content button, wherein the rendered selectable knowledge content button links to a knowledge content form;
    selecting the rendered selectable knowledge content button, wherein the selection of the rendered selectable knowledge content button launches the knowledge content form;
    completing the knowledge content form by the agent; and
    completing the interaction with the client with enhanced input from the searching.

2. The method of claim 1, the method further comprising integrating to an external application for the agent in the web client application.

3. The method of claim 1, the method further comprising initializing the graphical user interface in the web client application.

4. The method of claim 1, wherein the interaction with the client is any one of a live telephone call, e-mail, face-to-face, or a web chat session with the client.

5. The method of claim 1, wherein the graphical user interface further includes an integrated search area for the search step.

6. The method of claim 1, further comprising logging into the web client application by the agent.

7. The method of claim 1, further comprising completing the interaction with the client without the knowledge search if the knowledge search feature is not configured.

8. A method of embedding and launching a form with an external application for an agent in a web client application, the method comprising:
    searching, by the agent, for relevant third-party knowledge content through a third-party integration module using a graphical user interface;
    viewing, on the graphical user interface, a third-party knowledge content article received through the relevant knowledge content search on the graphical user interface, wherein the third-party knowledge content article is from a third-party knowledge content website, further wherein, only when viewed through the graphical user interface of the web client application, the third-party knowledge content article contains a rendered selectable knowledge content button, wherein the rendered selectable knowledge content button links to a knowledge content form;
    selecting the rendered selectable knowledge content button, wherein the selection of the rendered selectable knowledge content button launches the knowledge content form;
    completing the knowledge content form by the agent; and
    completing an interaction with a client with or without enhanced input from the searching, wherein the agent completed the interaction with existing resources when no knowledge search is configured, further wherein the agent completes the interaction with only verbal information when no knowledge content form is configured for the third-party knowledge content website.

9. The method of claim 8, the method further comprising integrating to an external application for the agent in the web client application.

10. The method of claim 8, the method further comprising initializing the graphical user interface in the web client application.

11. The method of claim 8, wherein the interaction with the client is any one of a live telephone call, e-mail, face-to-face, or a web chat session with the client.

12. The method of claim 8, further comprising logging into the web client application by the agent.

13. The method of claim 8, wherein the graphical user interface further includes an integrated search area for the searching.

14. The method of claim 8, wherein the graphical user interface includes a search result area, wherein the agent can review a plurality of summaries of a set of search results.

15. A system for embedding and launching a form with an external application for an agent in a web client application, comprising:
    a processor;
    a display with a graphical user interface; and
    a non-transitory computer readable medium programmed with computer readable code that upon execution by the processor causes the processor to:

start the web client application by the agent, wherein the web client application utilizes a graphical user interface;

use, by the agent, the graphical user interface to initiate an interaction with a client through the web client application;

search, by the agent, for relevant third-party knowledge content through a third-party integration module using the graphical user interface;

view, on the graphical user interface, a third-party knowledge content article received through the relevant knowledge content search on the graphical user interface, wherein the third-party knowledge content article is from a third-party knowledge content website, further wherein, only when viewed through the graphical user interface of the web client application, the third-party knowledge content article contains a rendered selectable knowledge content button, wherein the rendered selectable knowledge content button links to a knowledge content form;

select the rendered selectable knowledge content button, wherein the selection of the rendered selectable knowledge content button launches the knowledge content form;

complete the knowledge content form by the agent; and complete the interaction with the client with enhanced input from the searching.

16. The system of claim 15, wherein the processor is further caused to integrate to an external application for the agent in the web client application.

17. The system of claim 15, wherein the processor is further configured to initialize the graphical user interface in the web client application.

18. The system of claim 15, wherein the interaction with the client is any one of a live telephone call, e-mail, face-to-face, or a web chat session with the client.

19. The system of claim 15, wherein the graphical user interface further includes an integrated search area for the search step.

20. The system of claim 15, wherein the processor of further configured to log into the web client application.

* * * * *